US012693749B2

(12) United States Patent (10) Patent No.: US 12,693,749 B2
Xiao et al. (45) Date of Patent: Jul. 28, 2026

(54) METHOD FOR ADJUSTING FRAME RATE OF PHOTOELECTRIC NAVIGATION DEVICE AND PHOTOELECTRIC NAVIGATION DEVICE

(71) Applicant: Wuxi Instant Microelectronics Co., Ltd., Wuxi (CN)

(72) Inventors: Yong Xiao, Wuxi (CN); Haiyan Xiang, Wuxi (CN); Tao Hu, Wuxi (CN)

(73) Assignee: Wuxi Instant Microelectronics Co., Ltd., Wuxi City (CN)

( * ) Notice: Subject to any disclaimer, the term of this patent is extended or adjusted under 35 U.S.C. 154(b) by 0 days.

(21) Appl. No.: 19/096,351

(22) Filed: Mar. 31, 2025

(65) Prior Publication Data

US 2025/0231630 A1 Jul. 17, 2025

(51) Int. Cl.
 *G06F 3/038* (2013.01)
 *G06F 3/03* (2006.01)
 *G06F 3/0354* (2013.01)
(52) U.S. Cl.
 CPC .......... *G06F 3/0383* (2013.01); *G06F 3/0325* (2013.01); *G06F 3/03543* (2013.01)
(58) Field of Classification Search
 CPC ... G06F 3/0383; G06F 3/0325; G06F 3/03543
 See application file for complete search history.

(56) References Cited

U.S. PATENT DOCUMENTS

| | | | | |
|---|---|---|---|---|
| 10,509,493 B2 * | 12/2019 | Tan | ...................... | G06F 3/03543 |
| 2007/0150194 A1 * | 6/2007 | Chirikov | ............... | G06F 3/0317 |
| | | | | 701/500 |
| 2009/0195505 A1 * | 8/2009 | Chen | ...................... | G06F 1/3259 |
| | | | | 345/166 |
| 2013/0229514 A1 * | 9/2013 | Huang | ................... | G01C 11/02 |
| | | | | 348/140 |
| 2014/0160024 A1 * | 6/2014 | Huang | ................... | G06F 3/0317 |
| | | | | 345/166 |
| 2015/0301630 A1 * | 10/2015 | Lee | ........................ | G06F 3/0383 |
| | | | | 345/163 |
| 2017/0131799 A1 * | 5/2017 | Tan | ........................ | G06F 3/0317 |
| 2018/0373352 A1 * | 12/2018 | Tan | ........................ | G01P 15/032 |
| 2020/0401237 A1 * | 12/2020 | Lim | ..................... | G06F 3/03543 |
| 2023/0221806 A1 * | 7/2023 | Kong | ................... | G06F 3/0304 |
| | | | | 345/166 |

* cited by examiner

*Primary Examiner* — Ariel A Balaoing

(57) ABSTRACT

Provided is a method of adjusting a frame rate of a photoelectric navigation device and a photoelectric navigation device. The method includes: acquiring a first image frame and a second image frame by the photoelectric navigation device at a first frame rate; determining a current moving displacement of the photoelectric navigation device; determining a matching result of the first image frame and the second image frame when the moving displacement is within a set range between a high displacement threshold and a low displacement threshold; and adjusting the first frame rate of the photoelectric navigation device to a second frame rate when the matching result does not meet a set matching condition. The second frame rate is greater than the first frame rate. The frame rate of the photoelectric navigation device can be adjusted accurately using the method.

18 Claims, 5 Drawing Sheets

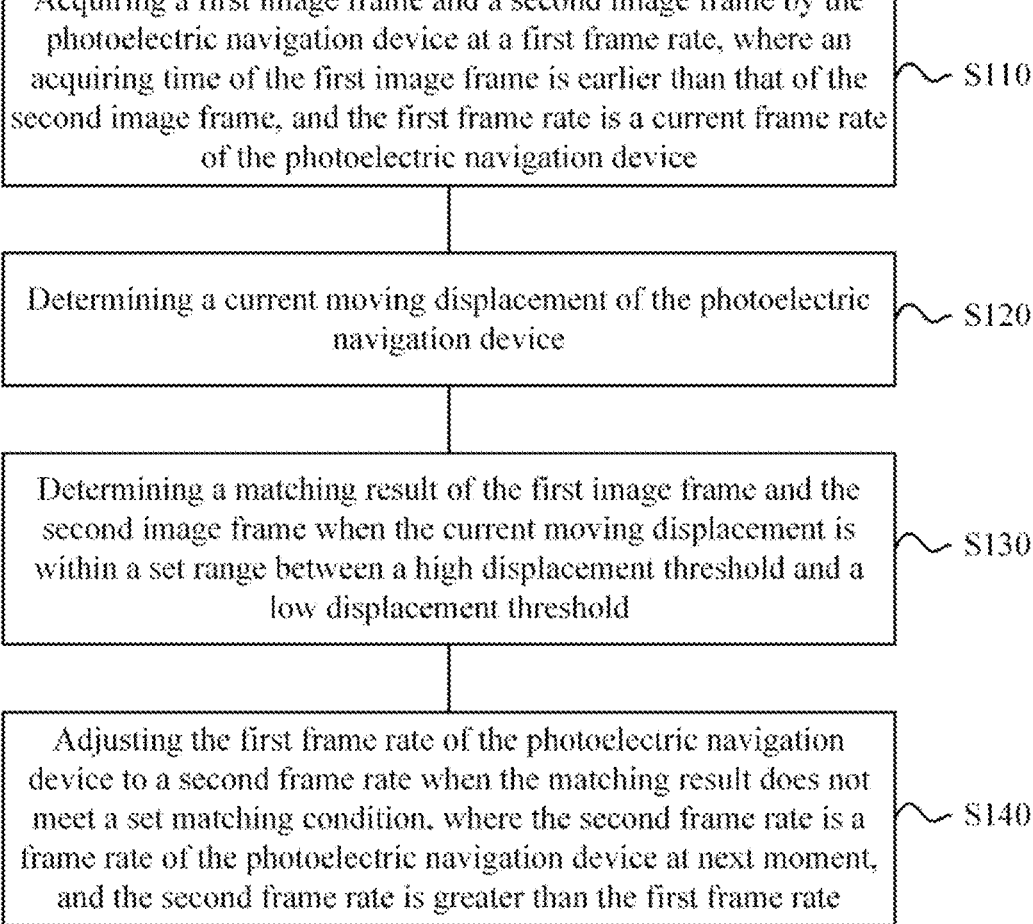

Acquiring a first image frame and a second image frame by the photoelectric navigation device at a first frame rate, where an acquiring time of the first image frame is earlier than that of the second image frame, and the first frame rate is a current frame rate of the photoelectric navigation device ～ S110

Determining a current moving displacement of the photoelectric navigation device ～ S120

Determining a matching result of the first image frame and the second image frame when the current moving displacement is within a set range between a high displacement threshold and a low displacement threshold ～ S130

Adjusting the first frame rate of the photoelectric navigation device to a second frame rate when the matching result does not meet a set matching condition, where the second frame rate is a frame rate of the photoelectric navigation device at next moment, and the second frame rate is greater than the first frame rate ～ S140

FIG. 1

METHOD FOR ADJUSTING FRAME RATE OF PHOTOELECTRIC NAVIGATION DEVICE AND PHOTOELECTRIC NAVIGATION DEVICE

TECHNICAL FIELD

The present disclosure relates to the technical field of photoelectric navigation devices, and in particular to a method for adjusting a frame rate of a photoelectric navigation device and a device thereof.

BACKGROUND

At present, the image capture frequency of the image sensor is changed to achieve flexible and adaptive frame rate adjustment, so as to reduce power consumption of the photoelectric navigation device (such as the photoelectric mouse).

For example, when the motion speed of the device decreases (the current displacement is less than the low displacement threshold), the frame rate is reduced; and when the motion speed increases (the current displacement is greater than the high displacement threshold), the frame rate is increased.

In the above frame rate adjustment process, when the motion speed is extremely low, the image capture frame rate is set to be relatively slow, so that when acceleration, deceleration, or movement to an interface with a poor image quality occurs, the acceleration or deceleration that a photoelectric mouse can handle depends on the image capture frame rate and the displacement of the photoelectric mouse can be correctly calculated depending on the matching method. Therefore, out of control or speed interruption may occur.

SUMMARY

The problem solved by the present disclosure is how to adjust the frame rate of the photoelectric navigation device in time to ensure the response speed.

In order to solve the above problem, in the first aspect, the present disclosure provides a method of adjusting a frame rate of a photoelectric navigation device, including:

acquiring a first image frame and a second image frame by the photoelectric navigation device at a first frame rate, where an acquiring time of the first image frame is earlier than that of the second image frame;

determining a current moving displacement of the photoelectric navigation device;

determining a matching result of the first image frame and the second image frame when the moving displacement is within a set range between a high displacement threshold and a low displacement threshold; and adjusting the frame rate of the photoelectric navigation device to a second frame rate when the matching result does not meet a set matching condition, where the second frame rate is a frame rate of the photoelectric navigation device at the next moment, and the second frame rate is greater than the first frame rate.

In one embodiment, the method of adjusting the frame rate of the photoelectric navigation device according to the present disclosure further includes:

keeping the first frame rate of the photoelectric navigation device unchanged when the matching result meets the set matching condition.

In one embodiment, the method of adjusting the frame rate of the photoelectric navigation device according to the present disclosure further includes:

adjusting the first frame rate of the photoelectric navigation device to a third frame rate when the current moving displacement exceeds the high displacement threshold, where the third frame rate is the frame rate of the photoelectric navigation device at the next moment, and the third frame rate is greater than the first frame rate.

In one embodiment, the method of adjusting the frame rate of the photoelectric navigation device according to the present disclosure further includes:

adjusting the first frame rate of the photoelectric navigation device to a fourth frame rate when the current moving displacement is lower than the low displacement threshold, where the fourth frame rate is a frame rate of the photoelectric navigation device at the next moment, and the fourth frame rate is less than the first frame rate.

In one embodiment, according to the method of adjusting the frame rate of the photoelectric navigation device according to the present disclosure, the second frame rate is the highest frame rate.

In one embodiment, according to the method of adjusting the frame rate of the photoelectric navigation device according to the present disclosure, the third frame rate is an adjacent frame rate greater than the first frame rate.

In one embodiment, according to the method of adjusting the frame rate of the photoelectric navigation device according to the present disclosure, the fourth frame rate is an adjacent frame rate less than the first frame rate.

In one embodiment, according to the method of adjusting the frame rate of the photoelectric navigation device according to the present disclosure, the determining a matching result of the first image frame and the second image frame includes:

determining the most relevant regions of the first image frame and the second image frame according to the moving displacement; and determining a similarity between the most relevant regions as the matching result, and when the similarity is less than a set similarity threshold, indicating that the matching result does not meet a preset matching condition.

In one embodiment, according to the method of adjusting the frame rate of the photoelectric navigation device according to the present disclosure, the determining a current moving displacement of the photoelectric navigation device includes:

determining a prediction vector according to a historical moving displacement of the photoelectric navigation device; and determining the current moving displacement of the photoelectric navigation device according to the prediction vector.

In the second aspect, the present disclosure provides a photoelectric navigation device, which includes a memory, an image sensor, a processor and a computer program stored on the memory and executable on the processor. The image sensor is configured to acquire an image frame, and the processor, when executing the program, implements the method of adjusting the frame rate of the photoelectric navigation device as described in the first aspect.

The present disclosure provides the method of adjusting the frame rate of the photoelectric navigation device and the device thereof. When the photoelectric navigation device operates, that is, in the process that the image sensor continuously captures image frames at the current frame rate, a first image frame and a second image frame can be acquired first; and then the current moving displacement of the photoelectric navigation device is determined. The determined moving displacement is compared with the set high displacement threshold and the set low displacement threshold. Moreover, a matching result of the first image frame and the second image frame is then determined when the comparison result indicates that the current moving displacement is within the range between the high displacement threshold and the low displacement threshold. Finally, when the matching result does not meet a set matching condition, it indicates that when the determined current moving displacement is incorrect and cannot be used as a basis for adjusting the frame rate, the current frame rate of the photoelectric navigation device can be directly increased as the frame rate at the next moment, so that the frame rate of the photoelectric navigation device can be adjusted accurately in a special motion scene, ensuring the response speed of the photoelectric navigation device at the next moment and avoiding navigation failure or interruption caused by speed increase or movement to the edge of the image.

BRIEF DESCRIPTION OF THE DRAWINGS

FIG. 1 is a flow diagram of a method for adjusting a frame rate of a photoelectric navigation device according to some embodiments of the present disclosure.

Figure 2:
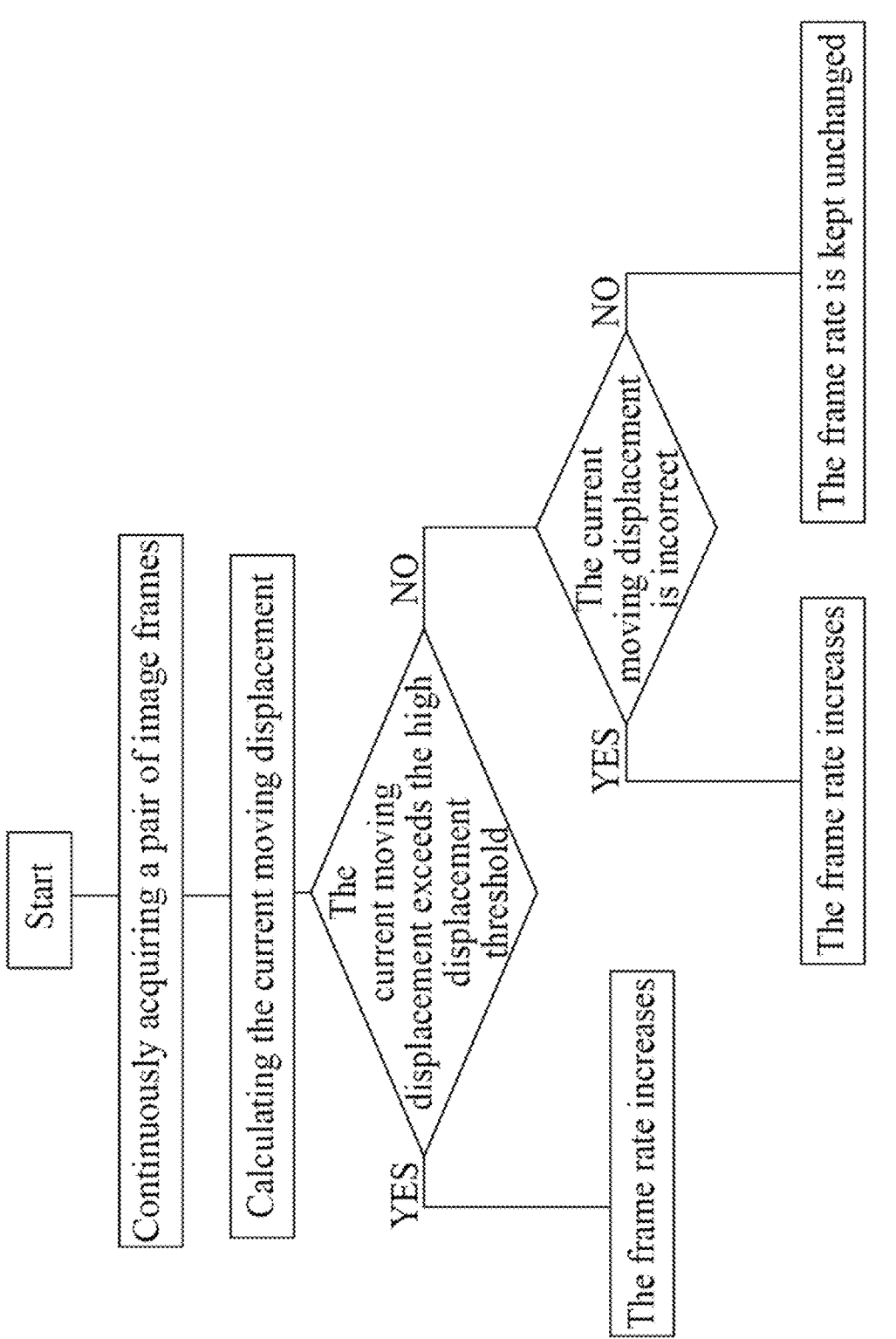
FIG. 2 is a flow diagram of a method for adjusting a frame rate of a photoelectric navigation device according to further embodiments of the present disclosure.

DETAILED DESCRIPTION OF THE
EMBODIMENTS

The present disclosure will be further described in detail with reference to the drawings and the embodiments. It can be understood that the specific embodiments described here are only used to explain the related inventions, rather than limit the present disclosure. In addition, for the convenience of description, only the parts related to the present disclosure are shown in the drawings.

It should be noted that the embodiments in the present disclosure and the features in the embodiments can be combined with each other without conflict. The present disclosure is described in detail with reference to the drawings and the embodiments.

It can be understood that in the photoelectric navigation device, the image capture frequency of the image sensor of the photoelectric navigation device can be changed to reduce power consumption, that is, the frame rate of the photoelectric navigation device can be adjusted according to the motion speed (the current moving displacement) of the photoelectric navigation device to achieve low power consumption.

In the above scene, when the movement of the photoelectric navigation device suddenly changes, such as accelerating suddenly, or when the photoelectric navigation device moves to an interface with a poor image quality, adjusting the frame rate according to the motion speed will cause the response of the photoelectric navigation device to fail, e.g., out of control of a cursor or speed interruption.

It can be understood that the photoelectric navigation device in the embodiment of the present disclosure can be a photoelectric mouse or the like, which uses a photoelectric sensor for positioning and navigation, which is not specifically limited in the present disclosure.

In the embodiment of the present disclosure, in order to ensure the real-time response of the photoelectric navigation device and avoid the problem of out-of-control or interruption upon sudden acceleration, or movement to an interface with a poor image quality, the determined current moving displacement is accurately determined, and when there is an error in the determined current moving displacement, the determined moving displacement is ignored, and the current frame rate of the photoelectric navigation device is directly improved, so as to meet the current moving state of the photoelectric navigation device and ensure the timely response of navigation.

In order to better understand the method for adjusting the frame rate of the photoelectric navigation device according to the embodiment of the present disclosure, the method is described in detail through the drawings hereinafter.

FIG. 1 is a flow diagram of a method for adjusting a frame rate of a photoelectric navigation device according to an embodiment of the present disclosure.

The method can be executed by a device with a data processing function, that is, a processor in the photoelectric navigation device. As shown in FIG. 1, the method specifically includes steps S110-S140.

In step S110, a first image frame and a second image frame are acquired by the photoelectric navigation device at a first frame rate. The acquiring time of the first image frame is earlier than that of the second image frame, and the first frame rate is the current frame rate of the photoelectric navigation device.

In step S120, a current moving displacement of the photoelectric navigation device is determined.

In step S130, a matching result of the first image frame and the second image frame is determined when the moving displacement is within a set range between a high displacement threshold and a low displacement threshold.

In step S140, the frame rate of the photoelectric navigation device is adjusted to a second frame rate when the matching result does not meet a set matching condition. The second frame rate is the frame rate of the photoelectric navigation device at the next moment, and the second frame rate is greater than the first frame rate.

Specifically, with reference to the flow chart of the method for adjusting the frame rate shown in FIG. 1 and FIG. 2, in the method for adjusting a frame rate of a photoelectric navigation device according to the embodiment of the present disclosure provides, during navigation by the photoelectric navigation device, that is, in the process that the image sensor continuously captures image frames at the current frame rate, two consecutive images, i.e., the first image frame and the second image frame are acquired first at the current frame rate, i.e., the first frame rate.

The two consecutive images refer to the time sequence. That is, the first image frame is acquired first, and then the second image frame is acquired, that is, the acquiring time of the first image frame is earlier than that of the second image frame.

Actually, the two images can be two adjacent images or two images separated by one or more frames.

Figure 3:
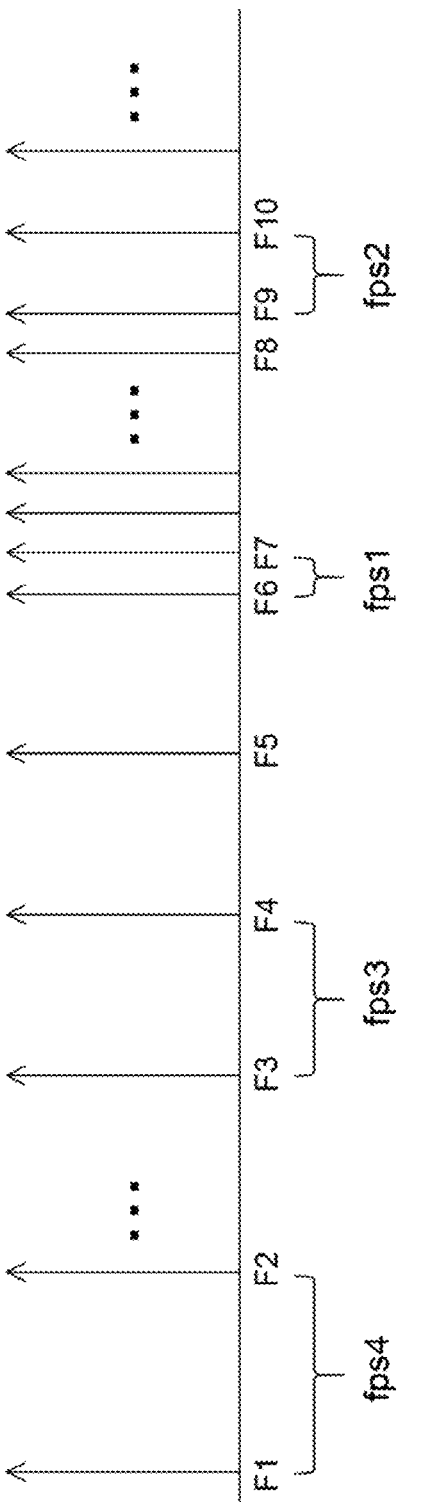
FIG. 3 is a schematic diagram of a time sequence of acquiring image frames by the photoelectric navigation device at various frame rates according to some embodiments of the present disclosure.

As shown in FIG. 3, the first image frame and the second image frame may be adjacent F1 and F2 at the frame rate of fps4, or may be two images at intervals at other frame rates.

It can be understood that the first image frame is not limited in the embodiment of the present disclosure.

Further, after the first image frame and the second image frame are acquired, the current moving displacement of the photoelectric device can be determined.

Further, the determined moving displacement is compared with the set high displacement threshold and the set low displacement threshold. A matching result of the first image frame and the second image frame is further determined when the moving displacement is within the set range between the high displacement threshold and the low displacement threshold.

After determination, when it is determined that the matching result does not meet a set matching condition, it indicates that when the determined current moving displacement of the photoelectric navigation device is incorrect and cannot be used as a basis for adjusting the frame rate.

At this time, in order to ensure the response speed of the photoelectric navigation device, the embodiment of the present disclosure can directly increase the current frame rate. That is, the current first frame rate is adjusted to the second frame rate, so as to achieve adjusting the frame rate of the photoelectric navigation device in this scene.

The second frame rate is greater than the first frame rate. The second frame rate is used as the frame rate set by the photoelectric navigation for capturing the image at the next moment, that is, the photoelectric navigation device can capture the image at the second frame rate at the next moment.

As shown in FIG. 3, fps1>fps2>fps3>fps4, and when the first frame rate is fps3, the second frame rate can be fps1 or fps2.

It can be understood that the embodiment of the present disclosure provides a method for adjusting a frame rate of a photoelectric navigation device. When the photoelectric navigation device operates, that is, in the process that the image sensor continuously captures image frames at the current frame rate, a first image frame and a second image frame can be acquired first; and then the current moving displacement of the photoelectric navigation device is determined; and the determined moving displacement is compared with the set high displacement threshold and the set low displacement threshold. Moreover, a matching result of the first image frame and the second image frame is then determined when the comparison result indicates that the current moving displacement is within the range between the high displacement threshold and the low displacement threshold. Finally, when the matching result does not meet the set matching condition, it indicates that the determined current moving displacement is incorrect and cannot be used as a basis for adjusting the frame rate, the current frame rate of the photoelectric navigation device can be directly increased as a frame rate at the next moment, so that the frame rate of the photoelectric navigation device can be adjusted accurately in a special motion scene, ensuring the response speed of the photoelectric navigation device at the next moment, and avoiding navigation failure or interruption caused by speed increase or movement to the edge of the image.

It can be understood that in the embodiment of the present disclosure, the frame rate of the photoelectric navigation device can be preset to a plurality of fixed values.

As shown in FIG. 3, the frame rate is preset to a plurality of fixed values such as fps1, fps2, fps3 and fps4 in a decreasing order.

In some embodiments, in S140, in order to ensure the response speed of the photoelectric navigation device, for frame rate adjustment in the case that the moving track of the device cannot be accurately tracked due to sudden acceleration or the device moving to an interface with a poor image quality, etc., that is, in the case that it is determined that the current moving displacement is incorrect, the present disclosure can directly adjust the second frame rate of the photoelectric navigation device to the highest frame rate, that is, the frame rate at the next moment can be directly increased to fps1.

It can be understood that the embodiment of the present disclosure can set the specific adjustment mode of the frame rate according to the actual situation, which is not limited in the present disclosure.

As shown in FIG. 2, in some embodiments of the present disclosure, when the matching result meets the set matching condition, it indicates that the current moving displacement of the photoelectric navigation device is determined to be accurate, that is, the current frame rate can meet the speed response of navigation, so that the current first frame rate of the photoelectric navigation device is kept unchanged, that is, keeping the first frame rate.

Further, as shown in FIG. 2, in some embodiments of the present disclosure, when the determined moving displacement is compared with the high displacement threshold and the low displacement threshold, when it is determined that the moving displacement exceeds the set high displacement threshold, it indicates that the photoelectric navigation device is currently in an accelerated state. That is, the motion speed is increased. In order to ensure timely response, the current frame rate can be increased so that the frame rate at the next moment is greater than the current frame rate.

The frame rate of the photoelectric navigation device is adjusted to a third frame rate when the current moving displacement exceeds the set high displacement threshold. The third frame rate is the frame rate of the photoelectric navigation device at the next moment, and the third frame rate is greater than the first frame rate.

Alternatively, when comparing the determined moving displacement with the high displacement threshold and the low displacement threshold, when it is determined that the moving displacement is lower than the set low displacement threshold, it indicates that the photoelectric navigation device is currently in a low speed state, that is, the motion speed is reduced. In order to reduce the power consumption of the photoelectric navigation device, the current frame rate can be reduced so that the frame rate at the next moment is less than the current frame rate.

The frame rate of the photoelectric navigation device is adjusted to a fourth frame rate when the moving displacement is lower than the set low displacement threshold. The fourth frame rate is the frame rate of the photoelectric navigation device at the next moment, and the fourth frame rate is less than the first frame rate.

After the frame rate is increased, the frequency of capturing images is accelerated, and the relevance between matched image frames is strong, thereby being capable of tracking the track accurately. When the device moves slowly, in order to reduce the power consumption, the frame rate is reduced without using the faster current frame rate for tracking.

In the embodiment of the present disclosure, in the case that a plurality of fixed values of the frame rate are set, for frame rate adjustment in the above two cases, the frame rate can be gradually increased, such as gradually increasing the frame rate from the current frame rate, that is the third frame rate is an adjacent frame rate greater than the first frame rate or the frame rate is gradually reduced from the current frame rate, that is the fourth frame rate is an adjacent frame rate less than the first frame rate.

For example, when the current moving displacement exceeds the high displacement threshold and the current frame rate is fps3, the frame rate of the photoelectric navigation device at the next moment, namely the third frame rate, can be adjusted to fps2, that is, gradually increased. Alternatively, the frame rate can be directly increased to fps2.

For another example, when the current moving displacement is lower than the low displacement threshold and the current frame rate is fps2, the frame rate of the photoelectric navigation device at the next moment namely the fourth frame rate can be adjusted to fps3, that is, gradually reduced. Alternatively, the frame rate can be directly reduced to fps4.

It can be understood that the specific mode of adjusting the frame rate in the embodiment of the present disclosure can be flexibly set according to the actual situation, which is not limited in the present disclosure.

In one embodiment, in some embodiments of the present disclosure, in S120, determining the moving displacement may specifically include the following steps:

S121, determining a prediction vector according to a historical moving displacement of the photoelectric navigation device; and S122, determining the current moving displacement of the photoelectric navigation device according to the prediction vector.

Specifically, in the embodiment of the present disclosure, the photoelectric navigation device can first obtain a prediction vector according to the linear combination of the previous displacements. That is, the prediction vector can be determined according to the historical moving displacement, and then a local search region can be effectively positioned according to the prediction vector. Finally, the current moving displacement of the photoelectric navigation device can be determined in the positioned local search region.

It can be understood that using such method, that is, by matching in the positioned local region, the resources and costs are greatly saved when compared with the global search.

Figure 4:
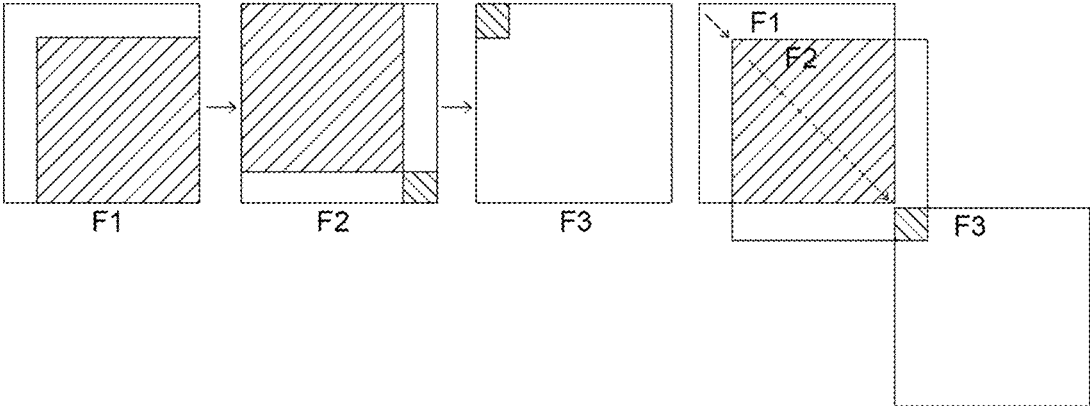
FIG. 4 is a schematic diagram of a motion of an image frame according to some embodiments of the present disclosure.

As shown in FIG. 4, in the embodiment of the present disclosure, the matching result in S130 can be specifically the similarity between the most relevant regions of the first image frame and the second image frame, and the set matching condition can be a similarity threshold. That is, the similarity between the two most relevant regions is not lower than the set similarity threshold, which indicates that the matching condition is met.

Specifically, after determining the current moving displacement of the photoelectric navigation device, the most relevant regions of the first image frame and the second image frame can be determined by backward derivation according to the determined moving displacement first, and then the similarity between the two most relevant regions can be determined. Finally, it is determined whether the matching condition is met according to comparison between the set similarity threshold and the similarity.

For example, as shown in FIG. 4, which represents the actual moving process of the image during acceleration, the forward slash part represents the overlapping part of F1-F2, i.e. the most relevant region. At this time, the movement is slow, and the accurate displacement can be calculated. After F3 is acquired, the matching is still based on the obtained prediction vector. The back slash part represents the actual overlapping part of F2-F3, i.e. the most relevant region. On the one hand, the overlapping part is too small, and the relevance between the two images is too small, and on the other hand, the actual overlapping region is not within the positioned search region, so that the calculated displacement is incorrect, and subsequent matching is likely to be incorrect, ultimately causing the track to be interrupted.

It can be understood that if the similarity is less than the set threshold, it indicates that the determined moving displacement is incorrect. That is, when the photoelectric navigation device moves slowly, the displacement obtained by matching is small, and the frame rate is slow at this time. If the device suddenly accelerates, and the frame rate is slow, the two acquired images that need to be matched do not satisfy matching conditions, and the displacement obtained by matching is incorrect.

It can also be understood that the matching result and the corresponding matching conditions can be adjusted according to the actual situation, which are not limited to the similarity between the most relevant regions in this embodiment.

In order to understand the method for adjusting the frame rate of the photoelectric navigation device according to the embodiment of the present disclosure better, the process will be described in detail with reference to FIG. 2, FIG. 3 and FIG. 4.

Specifically, when the photoelectric navigation device moves slowly, the image sensor captures image frames F1 and F2 at the frame rate of fps4, and the current moving displacement is calculated. When the current displacement is less than the high displacement threshold (for example, 6) and greater than the low displacement threshold (for example, 2), the image is continuously captured at the current frame rate.

Further, after the image frame F3 is captured, the current moving displacement is calculated to be greater than the high displacement threshold, the frame rate is increased to fps3, and image frames F4, F5 and F6 are captured at the frame rate of fps3.

When the image frame F6 is captured, the current displacement is calculated. At this time, the calculated displacement is incorrect caused by the sudden acceleration of the device or the device moving to the interface with a poor image quality.

At this time, the matching results of F5 and F6 are as shown in FIG. 4. The most relevant region between the two frames is the back slash region which is very small, that is, the relevant region of the two frames is very small. That is, the corresponding similarity is lower than the similarity threshold, which leads to a matching error.

The moving track of the device cannot be tracked accurately due to the sudden acceleration or the device moving to the interface with a poor image quality. In order to ensure the performance, the frame rate is increased to the highest fps1 (fps1>fps2>fps3>fps4) and the image frame F7 is acquired for subsequent track tracking.

Finally, when the calculated displacement is correct, the device moves slowly, and the displacement is less than the low displacement threshold, the frame rate is reduced to fps2 to reduce power consumption.

It can be understood that the embodiment of the present disclosure provides a method for adjusting a frame rate of a photoelectric navigation device. When the photoelectric navigation device operates, that is, in the process that the image sensor continuously captures image frames at the current frame rate, a first image frame and a second image frame can be acquired first; and then the current moving displacement of the photoelectric navigation device is determined; and the determined moving displacement is compared with the set high displacement threshold and the set low displacement threshold. Moreover, a matching result of the first image frame and the second image frame is then determined when the comparison result indicates that the current moving displacement is within the range between the high displacement threshold and the low displacement threshold. Finally, when the matching result does not meet a set matching condition, it indicates that the determined current moving displacement is incorrect and cannot be used as a basis for adjusting the frame rate, the current frame rate of the photoelectric navigation device can be directly increased as a frame rate at the next moment, so that the frame rate of the photoelectric navigation device can be adjusted accurately in a special motion scene, ensuring the response speed of the photoelectric navigation device at the next moment, and avoiding navigation failure or interruption caused by speed increase or movement to the edge of an image.

On another aspect, an embodiment of the present disclosure further provides a device for adjusting a frame rate of a photoelectric navigation device, including an obtaining module, a first determining module, a second determining module and a first adjusting module.

The obtaining module is configured to obtain a first image frame and a second image frame acquired by the photoelectric navigation device at a first frame rate. The acquiring time of the first image frame is earlier than that of the second image frame, and the first frame rate is the current frame rate of the photoelectric navigation device.

The first determining module is configured to determine a current moving displacement of the photoelectric navigation device.

The second determining module is configured to determine a matching result of the first image frame and the second image frame when the moving displacement is within a set range between a high displacement threshold and a low displacement threshold.

The first adjusting module is configured to adjust the frame rate of the photoelectric navigation device to a second frame rate when the matching result does not meet a set matching condition. The second frame rate is a frame rate of the photoelectric navigation device at the next moment, and the second frame rate is greater than the first frame rate.

In one embodiment, the device of adjusting the frame rate of the photoelectric navigation device according to the embodiment of the present disclosure further includes a keeping module.

The keeping module is configured to keep the current first frame rate of the photoelectric navigation device unchanged when the matching result meets the set matching condition.

In one embodiment, the device of adjusting the frame rate of the photoelectric navigation device according to the embodiment of the present disclosure further includes a second adjusting module.

The second adjusting module is configured to adjust the frame rate of the photoelectric navigation device to a third frame rate when the moving displacement exceeds the set high displacement threshold. The third frame rate is a frame rate of the photoelectric navigation device at the next moment, and the third frame rate is greater than the first frame rate.

In one embodiment, the device of adjusting the frame rate of the photoelectric navigation device according to the embodiment of the present disclosure further includes a third adjusting module.

The third adjusting module is configured to adjust the frame rate of the photoelectric navigation device to a fourth frame rate when the moving displacement is lower than the set low displacement threshold. The fourth frame rate is a frame rate of the photoelectric navigation device at the next moment, and the fourth frame rate is less than the first frame rate.

In one embodiment, according to the device of adjusting the frame rate of the photoelectric navigation device according to the embodiment of the present disclosure, the second frame rate is the highest frame rate.

In one embodiment, according to the device of adjusting the frame rate of the photoelectric navigation device according to the embodiment of the present disclosure, the third frame rate is an adjacent frame rate greater than the first frame rate.

In one embodiment, according to the device of adjusting the frame rate of the photoelectric navigation device according to the embodiment of the present disclosure, the fourth frame rate is an adjacent frame rate less than the first frame rate.

In one embodiment, according to the device of adjusting the frame rate of the photoelectric navigation device according to the embodiment of the present disclosure, the second determining module is specifically configured to:

determine the most relevant regions of the first image frame and the second image frame according to the moving displacement; and determine a similarity between the most relevant regions as the matching result, and when the similarity is less than a similarity threshold, indicate that the matching result does not meet a preset matching condition.

In one embodiment, according to the device of adjusting the frame rate of the photoelectric navigation device according to the embodiment of the present disclosure, the first determining module is specifically configured to:

determine a prediction vector according to a historical moving displacement of the photoelectric navigation device; and determine the current moving displacement of the photoelectric navigation device according to the prediction vector.

On another aspect, the photoelectric navigation device according to the embodiment of the present disclosure further includes a memory, a processor and a computer program stored on the memory and executable on the processor. The processor, when executing the program, implements the method of adjusting the frame rate of the photoelectric navigation device as described above.

Figure 5:
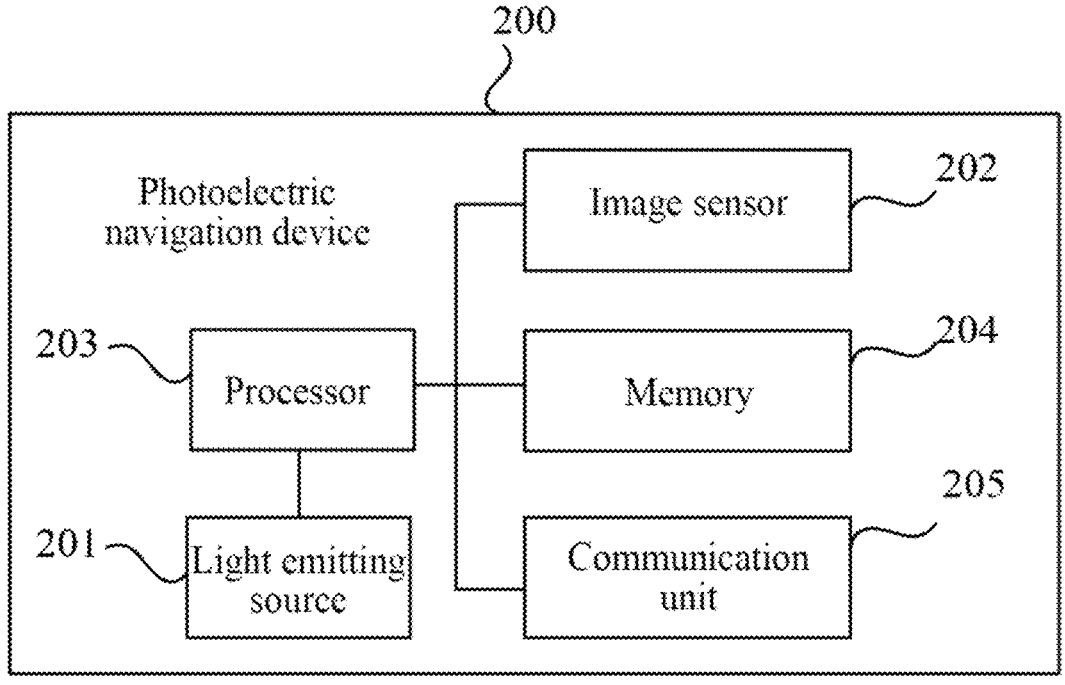
FIG. 5 is a schematic structural diagram of a device according to an embodiment of the present disclosure.

Refer to FIG. 5, it is a schematic structural diagram of a photoelectric navigation device according to an embodiment of the present disclosure.

As shown in FIG. 5, the photoelectric navigation device 200 may specifically include a light emitting source 201, an image sensor 202, a processor 203, a memory 204 and a communication unit 205. The above unit and modules are electrically connected to achieve communication.

The light emitting source 201 may be the light emitting diode (LED) device for generating light. The light is projected onto a target plane through a lens, and then the light is reflected back to the photoelectric navigation device to subsequently generate a pixel array.

The image sensor 202 can be configured to acquire an image frame, that is, to capture an image reflected from a plane to perform motion detection, so that when the photoelectric mouse moves, the moving track of the photoelectric mouse will be recorded as a group of coherent images taken at the high speed.

The processor 203, such as a Digital Signal Processor (DSP), is configured to analyze and process a series of images taken on the moving track, and then analyze the changes of the positions of the feature points on the images to judge the moving direction and the moving distance of the mouse, so as to complete the positioning of the cursor.

The memory 204 is electrically connected with the processor, and is configured to store a computer program, so that the processor, when executing the computer program, can implement the method of adjusting the frame rate in the above embodiments.

The communication unit 205 is configured to connect the photoelectric navigation device with a host device, such as through wired or wireless connection.

The flow charts and the block diagrams in the drawings illustrate the architectures, functions and operations of the electronic device, the method and the computer program product according to various embodiments of the present disclosure which may be implemented. In this regard, each block in the flow charts or the block diagrams may represent a module, a program segment, or a part of a code, which contains one or more executable instructions for implementing specified logical functions. It should also be noted that in some alternative implementations, the functions noted in the blocks may occur in a different order than those noted in the drawings. For example, two blocks shown in succession may actually be executed substantially in parallel, or may sometimes be executed in a reverse order, depending on the functions involved. It should also be noted that each block in the block diagrams and/or flow charts, and a combination of blocks in the block diagrams and/or flow charts, can be achieved by a dedicated hardware-based electronic device that performs specified functions or operations, or can be achieved by a combination of dedicated hardware and computer instructions.

The units or modules described in the embodiment of the present disclosure can be achieved by software or hardware. The described unit or module can also be provided in a processor, for example, which can be described as a processor including an obtaining module, a first determining module, a second determining module and a first adjusting module. In some cases, the names of these units or modules do not limit the units or modules themselves. For example, the first adjusting module can also be described as "configured to adjust the frame rate of the photoelectric navigation device to a second frame rate when the matching result does not meet a set matching condition, where the second frame rate is the frame rate of the photoelectric navigation device at the next moment, and the second frame rate is greater than the first frame rate".

On another aspect, the present disclosure further provides a computer-readable storage medium, which can be included in the photoelectric navigation device described in the above embodiments; which can also exist alone without being assembled into the photoelectric navigation device. The computer-readable storage medium stores one or more computer programs. The computer programs are used by one or more processors to execute the method of adjusting the frame rate of the photoelectric navigation device described in the present disclosure:

obtaining a first image frame and a second image frame acquired by the photoelectric navigation device at a first frame rate, where the acquiring time of the first image frame is earlier than that of the second image frame, and the first frame rate is the current frame rate of the photoelectric navigation device;

determining a current moving displacement of the photoelectric navigation device;

determining a matching result of the first image frame and the second image frame when the moving displacement is within a set range between a high displacement threshold and a low displacement threshold; and adjusting the frame rate of the photoelectric navigation device to a second frame rate when the matching result does not meet a set matching condition, where the second frame rate is the frame rate of the photoelectric navigation device at the next moment, and the second frame rate is greater than the first frame rate.

To sum up, the embodiment of the present disclosure provides a method of adjusting a frame rate of a photoelectric navigation device and a device thereof. When the photoelectric navigation device operates, that is, in the process that the image sensor continuously captures image frames at the current frame rate, a first image frame and a second image frame can be acquired first; and then the current moving displacement of the photoelectric navigation device is determined; and the determined moving displacement is compared with the set high displacement threshold and the set low displacement threshold. Moreover, a matching result of the first image frame and the second image frame is then determined when the comparison result indicates that the current moving displacement is within the range between the high displacement threshold and the low displacement threshold. Finally, when the matching result does not meet a set matching condition, it indicates that when the determined current moving displacement is incorrect and cannot be used as a basis for adjusting the frame rate, the current frame rate of the photoelectric navigation device can be directly increased as a frame rate at the next moment, so that the frame rate of the photoelectric navigation device can be adjusted accurately in a special motion scene, ensuring the response speed of the photoelectric navigation device at the next moment, and avoiding navigation failure or interruption caused by speed increase or movement to the edge of the image.

The above description is only the preferred embodiment of the present disclosure and the explanation of the applied technical principles. It should be understood by those skilled in the art that the scope involved in the present disclosure is not limited to the technical scheme formed by the specific combination of the above technical features, but also covers other technical schemes formed by any combination of the above technical features or their equivalent features without departing from the above concept. For example, the above features are replaced with (but not limited to) technical features with similar functions disclosed in the present disclosure to form technical schemes.

What is claimed is:

1. A method for adjusting a frame rate of a photoelectric navigation device, comprising:

acquiring a first image frame and a second image frame by the photoelectric navigation device at a first frame rate, wherein an acquiring time of the first image frame is earlier than that of the second image frame, and the first frame rate is a current frame rate of the photoelectric navigation device;

determining a current moving displacement of the photoelectric navigation device;

determining a matching result of the first image frame and the second image frame when the current moving displacement is within a predetermined range between a high displacement threshold and a low displacement threshold;

adjusting the first frame rate of the photoelectric navigation device to a second frame rate when the matching result does not meet a predetermined matching condition, indicating that the current moving displacement is erroneous, wherein the second frame rate is a frame rate of the photoelectric navigation device at a next moment, and the second frame rate is greater than the first frame rate;

keeping the first frame rate of the photoelectric navigation device unchanged when the matching result meets the predetermined matching condition; and adjusting the first frame rate of the photoelectric navigation device to a third frame rate when the current moving displacement exceeds the high displacement threshold, wherein the third frame rate is a frame rate of the photoelectric navigation device at the next moment, and the third frame rate is greater than the first frame rate.

2. The method for adjusting the frame rate of the photoelectric navigation device according to claim 1, wherein the method further comprises:

adjusting the first frame rate of the photoelectric navigation device to a fourth frame rate when the current moving displacement is lower than the low displacement threshold, wherein the fourth frame rate is a frame rate of the photoelectric navigation device at the next moment, and the fourth frame rate is less than the first frame rate.

3. The method for adjusting the frame rate of the photoelectric navigation device according to claim 1, wherein the second frame rate is a highest frame rate.

4. The method for adjusting the frame rate of the photoelectric navigation device according to claim 1, wherein the second frame rate is a highest frame rate.

5. The method for adjusting the frame rate of the photoelectric navigation device according to claim 1, wherein the second frame rate is a highest frame rate.

6. The method for adjusting the frame rate of the photoelectric navigation device according to claim 2, wherein the second frame rate is a highest frame rate.

7. The method for adjusting the frame rate of the photoelectric navigation device according to claim 1, wherein the third frame rate is an adjacent frame rate greater than the first frame rate.

8. The method for adjusting the frame rate of the photoelectric navigation device according to claim 2, wherein the fourth frame rate is an adjacent frame rate less than the first frame rate.

9. The method for adjusting the frame rate of the photoelectric navigation device according to claim 1, wherein the determining a matching result of the first image frame and the second image frame comprises:

determining most relevant regions of the first image frame and the second image frame according to the current moving displacement; and determining a similarity between the most relevant regions as the matching result, and when the similarity is less than a predetermined similarity threshold, indicating that the matching result does not meet the predetermined matching condition.

10. The method for adjusting the frame rate of the photoelectric navigation device according to claim 1, wherein the determining a matching result of the first image frame and the second image frame comprises:

determining most relevant regions of the first image frame and the second image frame according to the current moving displacement; and determining a similarity between the most relevant regions as the matching result, and when the similarity is less than a predetermined similarity threshold, indicating that the matching result does not meet the predetermined matching condition.

11. The method for adjusting the frame rate of the photoelectric navigation device according to claim 1, wherein the determining a matching result of the first image frame and the second image frame comprises:

determining most relevant regions of the first image frame and the second image frame according to the current moving displacement; and determining a similarity between the most relevant regions as the matching result, and when the similarity is less than a predetermined similarity threshold, indicating that the matching result does not meet the predetermined matching condition.

12. The method for adjusting the frame rate of the photoelectric navigation device according to claim 2, wherein the determining a matching result of the first image frame and the second image frame comprises:

determining most relevant regions of the first image frame and the second image frame according to the current moving displacement; and determining a similarity between the most relevant regions as the matching result, and when the similarity is less than a predetermined similarity threshold, indicating that the matching result does not meet the predetermined matching condition.

13. The method for adjusting the frame rate of the photoelectric navigation device according to claim 1, wherein the determining a current moving displacement of the photoelectric navigation device comprises:

determining a prediction vector according to a historical moving displacement of the photoelectric navigation device; and determining the current moving displacement of the photoelectric navigation device according to the prediction vector.

14. The method for adjusting the frame rate of the photoelectric navigation device according to claim 1, wherein the determining a current moving displacement of the photoelectric navigation device comprises:

determining a prediction vector according to a historical moving displacement of the photoelectric navigation device; and determining the current moving displacement of the photoelectric navigation device according to the prediction vector.

15. The method for adjusting the frame rate of the photoelectric navigation device according to claim 1, wherein the determining a current moving displacement of the photoelectric navigation device comprises:

determining a prediction vector according to a historical moving displacement of the photoelectric navigation device; and determining the current moving displacement of the photoelectric navigation device according to the prediction vector.

16. The method for adjusting the frame rate of the photoelectric navigation device according to claim 2, wherein the determining a current moving displacement of the photoelectric navigation device comprises:

determining a prediction vector according to a historical moving displacement of the photoelectric navigation device; and determining the current moving displacement of the photoelectric navigation device according to the prediction vector.

17. A photoelectric navigation device, comprising: a memory, an image sensor, a processor and a computer program stored on the memory and executable on the processor, wherein the image sensor is configured to acquire an image frame, and the processor performs the computer program for:

acquiring a first image frame and a second image frame by the photoelectric navigation device at a first frame rate, wherein an acquiring time of the first image frame is earlier than that of the second image frame, and the first frame rate is a current frame rate of the photoelectric navigation device;

determining a current moving displacement of the photoelectric navigation device;

determining a matching result of the first image frame and the second image frame when the current moving displacement is within a predetermined range between a high displacement threshold and a low displacement threshold;

adjusting the first frame rate of the photoelectric navigation device to a second frame rate when the matching result does not meet a predetermined matching condition, indicating that the current moving displacement is erroneous, wherein the second frame rate is a frame rate of the photoelectric navigation device at a next moment, and the second frame rate is greater than the first frame rate;

keeping the first frame rate of the photoelectric navigation device unchanged when the matching result meets the predetermined matching condition; and adjusting the first frame rate of the photoelectric navigation device to a third frame rate when the current moving displacement exceeds the high displacement threshold, wherein the third frame rate is a frame rate of the photoelectric navigation device at the next moment, and the third frame rate is greater than the first frame rate.

18. The photoelectric navigation device according to claim 17, wherein the first frame rate of the photoelectric navigation device is kept unchanged when the matching result meets the predetermined matching condition.

\* \* \* \* \*